(12) United States Patent
Dureau et al.

(10) Patent No.: US 10,313,841 B2
(45) Date of Patent: Jun. 4, 2019

(54) METHODS AND DEVICES FOR TRIGGERING AN ACTION ON A MOBILE DEVICE UPON DETECTION OF A STOP PERIOD OF THE MOBILE DEVICE IN A GIVEN PLACE

(71) Applicant: SNIPS, Paris (FR)

(72) Inventors: Joseph Dureau, Clichy (FR); Olivier Corradi, Paris (FR); Mael Primet, Paris (FR)

(73) Assignee: SNIPS, Paris (FR)

( * ) Notice: Subject to any disclaimer, the term of this patent is extended or adjusted under 35 U.S.C. 154(b) by 0 days.

(21) Appl. No.: 15/604,439

(22) Filed: May 24, 2017

(65) Prior Publication Data

US 2017/0347243 A1   Nov. 30, 2017

(30) Foreign Application Priority Data

May 25, 2016 (EP) .................................. 16171331

(51) Int. Cl.
*H04W 24/00* (2009.01)
*H04W 4/029* (2018.01)
(Continued)

(52) U.S. Cl.
CPC .......... *H04W 4/029* (2018.02); *G01C 21/206* (2013.01); *G01C 21/26* (2013.01); *G01S 5/0294* (2013.01); *H04W 4/023* (2013.01)

(58) Field of Classification Search
CPC . G01S 5/02; G01S 5/0252; G01S 5/14; G01S 5/0294; G01S 19/42; G01S 5/0268;
(Continued)

(56) References Cited

U.S. PATENT DOCUMENTS

| 7,388,541 B1* | 6/2008 | Yang | G01C 21/206 342/464 |
| 2011/0148623 A1* | 6/2011 | Bishop | G01C 21/20 340/539.13 |

(Continued)

FOREIGN PATENT DOCUMENTS

| EP | 3 182 738 A1 | 6/2017 |
| WO | WO 2015/035185 A1 | 3/2015 |

OTHER PUBLICATIONS

Yick J et al: "Analysis of a prediction-based mobility adaptive tracking algorithm", Broadband Networks, 2005 2nd International Conference on Boston, MA Oct. 3-7, 2005, Piscataway, NJ, USA. IEEE, Oct. 3, 2005 (Oct. 3, 2005), pp. 809-816, XP010890290, DOI: 10.1109/ICBN.2005.1589681 ISBN: 978-0-7803-9276-2.*

(Continued)

*Primary Examiner* — Kathy W Wang-Hurst
*Assistant Examiner* — B M M Hannan
(74) *Attorney, Agent, or Firm* — Knobbe, Martens, Olson & Bear, LLP

(57) ABSTRACT

Provided are methods and devices for determining a stop period of a mobile device in a location, according to geolocation data available on the mobile device. A predicted position of the mobile device and an associated level of uncertainty related to the predicted position is determined according to either the current position of the mobile device if it is available, or, if not, according to an artificial position obtained from a previously known position of the mobile device. The mobile device is considered to be in a stop period if the normalized prediction error between the predicted position and either the current position or the artificial position, depending on the situation, is smaller than a prediction error threshold. Upon detection of a stop period, an action on the mobile device is triggered.

11 Claims, 2 Drawing Sheets

(51) Int. Cl.
*G01C 21/20* (2006.01)
*G01C 21/26* (2006.01)
*G01S 5/02* (2010.01)
*H04W 4/02* (2018.01)

(58) Field of Classification Search
CPC ......... H04L 29/08657; H04L 29/08108; H04L 29/08936; H04W 4/02; H04W 64/00; H04W 4/029; H04W 4/023; G01C 21/20; G01C 21/206; G01C 21/26; H04M 1/72572
USPC .............................................. 455/456.1–457
See application file for complete search history.

(56) References Cited

U.S. PATENT DOCUMENTS

| | | | |
|---|---|---|---|
| 2013/0197857 | A1 | 8/2013 | Lu et al. |
| 2014/0156180 | A1 | 6/2014 | Marti et al. |
| 2014/0288822 | A1* | 9/2014 | Morrison ................ G01S 19/23 701/466 |
| 2015/0073702 | A1* | 3/2015 | Jouaux ................ G06Q 10/047 701/465 |
| 2015/0230055 | A1* | 8/2015 | Smith ................... H04W 4/029 455/456.3 |
| 2016/0183052 | A1* | 6/2016 | Qiu ....................... H04W 4/021 455/457 |
| 2017/0076217 | A1* | 3/2017 | Krumm ................. G06N 7/005 |
| 2017/0102244 | A1* | 4/2017 | Meredith ........... G01C 21/3629 |

OTHER PUBLICATIONS

Search Report and Written Opinion dated Nov. 14, 2016, for European Application No. 16171331.8 filed on May 25, 2016.
Särkkä, S. (2006). Recursive Bayesian Inference on Stochastic Differential Equations, Helsinki University of Technology Laboratory of Computational Engineering Publications.
Yick, J et al., Analysis of a prediction-based mobility adaptive tracking algorithm, Broadband Networks, 2005 $2^{nd}$ International Conference on Boston, MA, pp. 809-816, Oct. 3-7, 2005.

* cited by examiner

METHODS AND DEVICES FOR TRIGGERING AN ACTION ON A MOBILE DEVICE UPON DETECTION OF A STOP PERIOD OF THE MOBILE DEVICE IN A GIVEN PLACE

CROSS-REFERENCE TO RELATED APPLICATION(S)

This patent application claims the benefit under 35 U.S.C. § 119 of European Application No. 16171331.8 filed on May 25, 2016, which is hereby incorporated by reference in its entirety.

BACKGROUND

Technological Field

The described technology generally relates to mobile devices, such as mobile phones or navigation systems. More particularly, the described technology relates to means for identifying, in real-time, a stop period of a mobile device, according to geolocation data that may be noisy and/or partly missing.

Description of the Related Technology

A mobile device—such as a mobile phone, a tablet, a wearable object or a navigation system—is generally provided with means for obtaining data related to its past and current locations. For instance, geolocation data can be obtained from log files, or in real-time through a geolocation module. However, geolocation data accessible through such kind of mobile device are often only available for irregular time intervals, are sometimes entirely missing for several periods of time, and are affected by errors and uncertainties of varying levels.

SUMMARY OF CERTAIN INVENTIVE ASPECTS

Consequently, determining in real-time stop periods, during which the mobile device is located in a specific place—typically a point of interest such as a shop, an office, a public garden, etc.—is a particularly difficult task. A stop period relates to a time segment where the mobile device stays inside a specific place, as opposed to a move period when the mobile device moves from a first place to a second one. It should be understood that, during a stop period, the location of the mobile device may vary if the mobile device moves inside the specific place. For example, if, over a twenty minutes long period, the actual location of the mobile device remains inside the boundaries of a specific place such as an office or a supermarket, said specific period should be considered as a stop period, even if the mobile device has moved inside the office or the supermarket.

As geolocation data provided by the mobile device are typically noisy and not periodically sampled, identifying stop period by verifying that the geolocation data are comprised within the limits of a specific place over a period is not a reliable solution.

It is also known to implement the steps of spatial clustering methods using geo-localization data stored in log files. However, these solutions can only be implemented as a post-processing step, and are not adapted to be used in real-time on a mobile device.

It is therefore still desirable to provide means, embeddable in a mobile device, for identifying in real-time a stop period of said mobile device in a specific place, according to location data that may be noisy and/or partly missing.

To that end, according to a first aspect, the described technology concerns a method for determining a stop period of a mobile device in geographical locations, according to geolocation data related to said mobile device, and for triggering an action accordingly. The method comprises the following steps:

during a first step, determining a new predicted position $m_k^-$ of the mobile device according to the geolocation data and a first position related to the mobile device; the first position being either a current position $y_k$ of the mobile device if it is possible to obtain said current position from the geolocation data, or an artificial position of the mobile device determined according to a previously known current position $y_p$ of the mobile device;

during a second step, determining a normalized prediction error $nPrERR_k$ according to the difference between the new predicted position $m_k^-$ and the first position $y_k$;

if the normalized prediction error $nPrERR_k$ is smaller than a prediction error threshold TPrE, generating a stop message to indicate that the stop period is starting;

during a third step, triggering an action on the mobile device, according to the stop message.

The method according to the described technology allows real-time detection of stop periods. Moreover, the method according to the described technology allows detecting various spatial scales by adapting the prediction error threshold to the required spatial uncertainty level. For example, it is possible to detect stop periods at the scale of a city, a building, or for different rooms, provided that the prediction error threshold is precise enough. The method according to the described technology is adapted to manage geolocation data of widely different quality. The method according to the described technology does not make any assumptions about the regularity of incoming data—e.g. it does not need to assume a location arrives every 5 second. The method according to the described technology is adapted to take into account the accuracy of the received geolocation data, which depends on the combination of sensors used by the operating system of the mobile device.

During the second step, the normalized prediction error $nPrERR_k$ can be stored in a prediction error registry and a smoothed prediction error sPrERR may be determined by smoothing the normalized prediction errors $nPrERR_k$, over a predefined smoothing time period, according to prediction errors stored in the prediction error registry; the stop message to indicate that the stop period is starting being generated if the smoothed prediction error is smaller than the prediction error threshold. The smoothed prediction error can be determined by smoothing the prediction error, over a predefined smoothing time period, according to prediction errors stored in the prediction error registry using an exponential smoothing process.

During the second step, if the normalized prediction error $nPrERR_k$ is greater than the prediction error threshold TPrE, a move message may be generated to indicate that the stop period is no longer on-going; and the action triggered during the third step may be then interrupted or modified.

The first step, the second step and the third step may be executed every time the difference between the current position of the mobile device and one of previously known current positions of the mobile device over a predefined period is greater than a minimum distance; and/or according to a predefined schedule, and/or upon detection of specific events.

During the first step, a new predicted position $m_k^-$ and a new filtered position $m_k$ of the mobile device are obtained using a discrete-time Kalman Filter with the geolocation data and the first position. Using a Kalman filter is particularly advantageous since it allows taking into account efficiently uncertainties affecting the geolocation data. During the first step, an associated level of uncertainty Pk may be determined according to the new filtered position $m_k$. If the associated level of uncertainty Pk is greater than a loss of signal threshold, a loss of signal message may be generated to indicate that information is insufficient to determine if the mobile device is in a stop period; the action triggered during the third step being interrupted or modified. Consequently, the method according to the described technology is able to alert when it is not possible to determine accurately the stop period, because the geolocation data is not precise enough. In particular, if the current position of the mobile device is not available from the geolocation data, the artificial position for the first position may be set according to a last received new position $y_p$ available from the geolocation data.

According to a second aspect, the described technology also relates to a computer program that can be downloaded from a communication network and/or stored on a medium. This computer program comprises instructions for causing implementation of the method according to the first aspect, when said program is run by the processor.

According to a third aspect, the described technology also relates to information storage means, storing a computer program comprising a set of instructions causing implementation of the method according to the first aspect, when the stored information is read from said information storage means and run by a processor.

According to a fourth aspect, the described technology also concerns a mobile device adapted to implement the method according to the first aspect. The mobile device comprises means for determining a stop period of a mobile device in geographical locations, according to geolocation data related to said mobile device, and for triggering an action accordingly, characterized in that it comprises:

means for determining a new predicted position $m_k^-$ of the mobile device, according to the geolocation data and a first position related to the mobile device; the first position being either a current position $y_k$ of the mobile device if it is possible to obtain said current position from the geolocation data, or an artificial position of the mobile device according to a previously known current position $y_p$ of the mobile device;

means for determining a normalized prediction error $nPrERR_k$ according to the difference between the new predicted position $m_k^-$ and the first position;

if the normalized prediction error $nPrERR_k$ is smaller than a prediction error threshold TPrE, generating a stop message to indicate that the stop period is starting;

means for triggering an action on the mobile device, according to the stop message.

BRIEF DESCRIPTION OF THE DRAWINGS

Aspects of the described technology will emerge more clearly from the following description of an example of an embodiment of the described technology, said description being made with reference to the accompanying drawings, among which.

DETAILED DESCRIPTION

Figure 1:
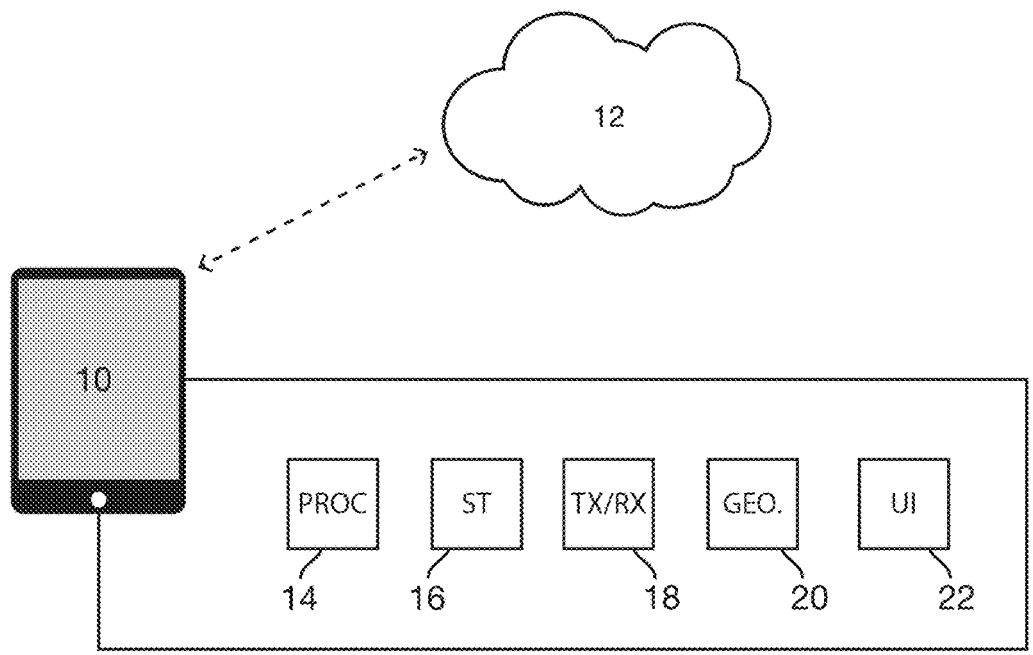
FIG. 1 schematically represents architecture of a mobile device adapted to implement the method according to aspects of the described technology.

FIG. 1 schematically represents a mobile device 10 in which a module according to the described technology may be implemented. The mobile device 10 is typically a telecommunication mobile device adapted to access wirelessly to a communication network 12. The mobile device 10 further comprises a processing module 14, for example a module provided with at least one Central Processing Unit and a Random-Access Memory. The mobile device 10 further comprises storage means 16, for example a Hard-Drive and/or a solid-state memory, for storing data and allowing the processing module 14 to read and/or write said data. The mobile device 10 includes at least one communication interface 18 adapted to allow wireless access to the communication network 12. In one embodiment, the communication network 12 is coupled to Internet. The mobile device 10 further comprises a geolocation module 20 coupled to the processing module and configured to allow the determination of the current geographical position of the mobile device 10 when turned on and/or activated. The geolocation module 20 may comprise means for determining the current geographical position using GPS, Galileo, beacons and/or WIFI means. The geolocation module 20 is adapted to deliver a stream of data related to the current location of the mobile device in real time. Data representing the current location comprise typically information related to the latitude, information related to the longitude and an associated level of uncertainty—typically a distance in meters from the estimated latitude and longitude, representing two standard deviations. The mobile device 10 further comprises a user-interface 22, provided for example with a touch-sensitive screen, sensors and an audio playback and recording interface. The processing module 14 is capable of executing instructions. The instructions form one computer program that causes the processing module 14 to perform some or all of the steps of the method described hereafter with regard to FIGS. 2 and 3.

Figure 4:
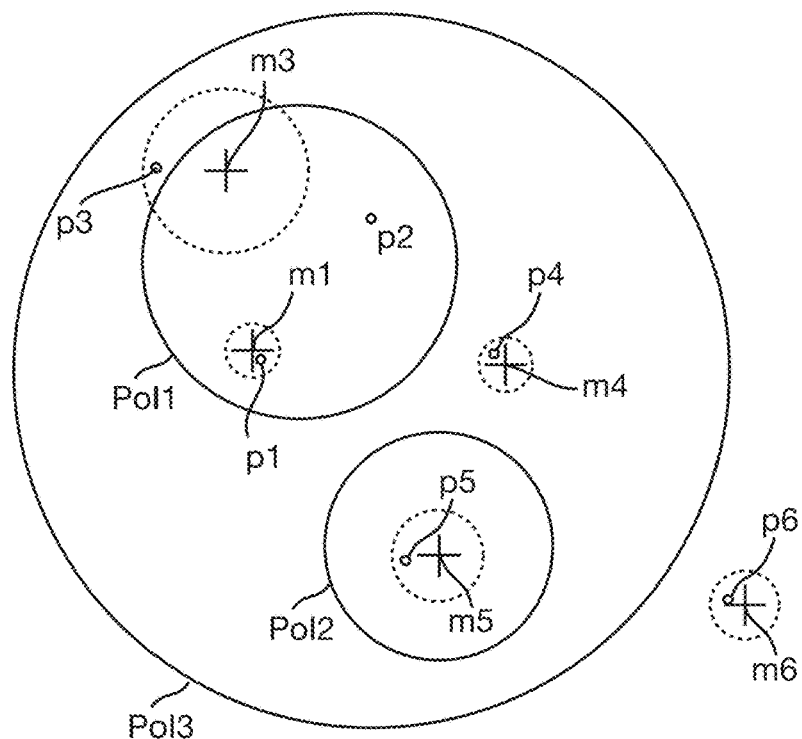
FIG. 4 schematically represents an example of a geographical distribution of points of interest.

We refer now to FIG. 4 on which three points of interest are represented. According to the described technology, a point of interest is a specific area that is relevant to an application of the mobile device and/or to a user. In the example of a mobile navigation system, the points of interest may relate to all the area/locations, where a user may want to go to and/or that can be searchable. A point of interest may relate to a building, a public or private space such as a museum or the home of the user, a shop or a gallery, an infrastructure like a bridge or railway station, a geographical area such as a mountain or a reserve, etc. A point of interest may include other points of interests. For example, if the point of interest is an airport, other points of interest such as gates or shops may be defined in sub-areas of the airport. The set of the points of interests used by the means according to the described technology to detect stop periods of the mobile device is defined according to the intended uses of stop periods by the application or the user. For example, the set of points of interest may comprise only the airport, if a stop period should be identified as long as the position of the mobile device is comprised within the boundaries of the airport. By contrast, the set of points of interest may comprise gates or shops inside sub-areas of the airport, if a move period should be identified when the mobile device moves from a shop to a gate, for example, inside the airport. In the example of FIG. 4, a first point of interest PoI1 and a second point of interest PoI2 are represented. The first point of interest PoI1 and the second point of interest PoI2 are located inside a third point of interest PoI3. For example, the third point of interest PoI3 may relate to a mall, the first point of interest PoI1 being related to a parking lot of the mall, the second point of interest PoI2 being related to a specific movie theatre inside the mall. On FIG. 4, the geographical area corresponding to each point of interest is represented by a circular area. However, it should be understood that each point of interest may have a more complex geometrical form, and may be continuous or discontinuous. A series of actual location p1 . . . p6 of the mobile device 10—i.e. the real position of the mobile device, not a geolocation data provided by the geolocation module 20—is also represented on FIG. 4. In this example, the locations p1, p2, p3 are comprised inside the first point of interest PoI1. The locations p5 is comprised inside the second point of interest PoI2. The location p6 is comprised outside the first point of interest PoI1, the second point of interest PoI2 and the third point of interest PoI3. On FIG. 4, a series of geolocation data m1 . . . m6, provided by the geolocation module 20, is also represented on FIG. 4. Each geolocation data relates to a corresponding location. For example, the geolocation data m1 corresponds to a measure of the position of the mobile device 10 at an instant t1, provided by the geolocation module 20, when the mobile device 10 is located in the position p1 inside the first point of interest PoI1 and the third point of interest PoI3. It should be noted that, typically, a plurality of geolocation data for a given position of the mobile device 10 may be provided by the geolocation module 20, when the mobile device 10 is moving slowly or is motionless. In the example of the FIG. 4, the geolocation data m2 related to the position of the mobile device 10 at an instant t2 when the mobile device 10 is located in the position p2, is missing, for instance because the geolocation module 20 is inactive or is not working properly (loss of satellite signals, internal errors, etc.). On FIG. 4, uncertainty level associated with each geolocation data m1 . . . m6 is represented by a dotted-line circle.

The geolocation data m1 . . . m6 are noisy: the actual locations p1 . . . p6 of the mobile device differ of various amounts from the corresponding geolocation data m1 . . . m6. The geolocation data m1 . . . m6 are not available for each period of time corresponding to the move of the mobile device from the location p1 to the location p6. For example, the geolocation data m2 is missing.

According to the described technology, a stop period relates to a time segment where the mobile device 10 stays inside a specific point of interest, as opposed to a move period where the mobile device moves from a point of interest to another point of interest. It should be understood that, during a stop period, the location of the mobile device 10 may vary if the mobile device moves inside the specific point of interest. In the example of the FIG. 4, a stop period SP1 can be determined for the first point of interest PoI1, and corresponds to a period during which the mobile device 10 stayed inside the first point of interest PoI1. In the example of the FIG. 4, a stop period SP2 can be determined for the first point of interest PoI2, and corresponds to a period during which the mobile device 10 stayed inside second point of interest PoI2. In the example of the FIG. 4, a stop period SP3 can be determined for the third point of interest PoI3, and corresponds to a period during which the mobile device 10 stayed inside the third point of interest PoI3. A stop period can be defined by a stop start time, stop duration, a stop position—latitude and longitude for example—and a position uncertainty—for example, a distance in meters from the stop position representing two standard deviations.

Figure 2:
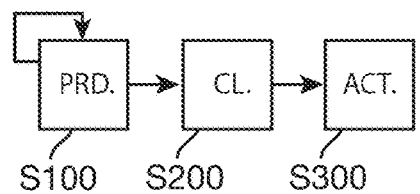
FIG. 2 schematically represents a method for identifying, in real-time, a stop period of the mobile device, according to geolocation data, and triggering an action accordingly.
Figure 3:
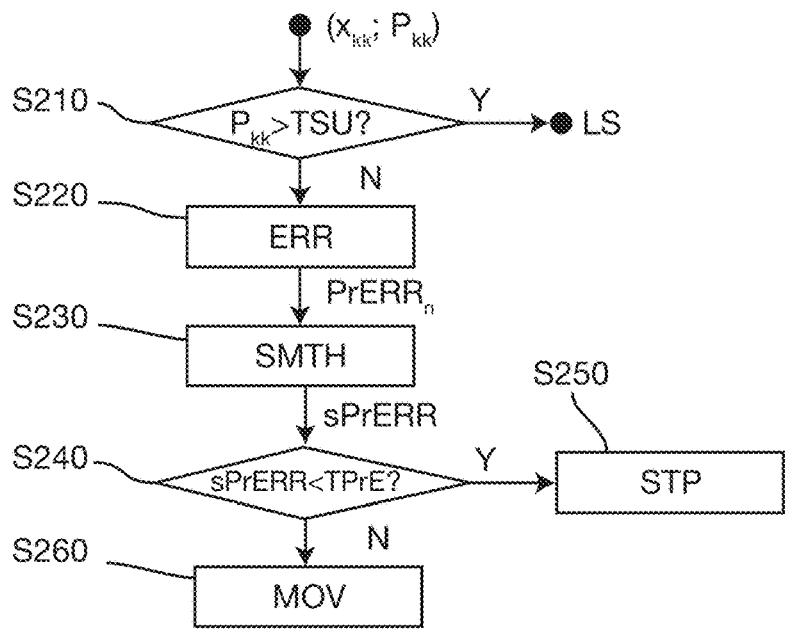
FIG. 3 schematically represents, in an embodiment, the detailed steps of the classification step of the method for identifying a stop according to aspects of the described technology.

Any and all steps of the method described hereafter with regard to FIGS. 2 and 3, may be implemented in software by execution of a set of instructions or program by a programmable computing machine, such as a Personal Computer (PC), a Digital Signal Processor (DSP) or a microcontroller; or else implemented in hardware by a machine or a dedicated component, such as an Field-Programmable Gate Array (FPGA) or an Application-Specific Integrated Circuit (ASIC).

FIG. 2 schematically represents a method to identify, in real-time, a stop period of the mobile device 10 in a point of interest, according to geolocation data that may be noisy and/or partly missing, and triggering an action accordingly. Geolocation data can be in particular provided by the geolocation module 20, which is adapted to deliver a stream of data related to the current location of the mobile device in real time. geolocation data comprise typically, for each measure of the position, information related to the latitude, information related to the longitude and an associated level of uncertainty—typically a distance in meters from the estimated latitude and longitude, representing two standard deviations.

The method is executed every time a new location $y_k$ of the mobile device 10 is identified in the geolocation data stream provided by the geolocation module 20. The new location $y_k$ of the mobile device 10 can be identified by using a distance filter on the geolocation data. The new location $y_k$ can be obtained by filtering geolocation data, so as that the current location of the mobile device 10 is considered as the new location $y_k$, only if the mobile device has moved from the previously determined new location by a minimum distance over a predefined period. Advantageously, the method can also be performed according to a schedule—for instance every 15 seconds, and/or upon detection of specific events and/or at specific periods—for example, when no new location $y_k$ of the mobile device has been detected for a predefined period. The method can also be performed when a user launches a specific app. The method comprises a prediction step S100, a classification step S200 and an action step S300.

During the prediction step S100, a new predicted position $m_k^-$ of the mobile device is determined. A prediction filtering process is used on the available geolocation data. The prediction filtering process may use of general filters, like particle filters.

In an exemplary embodiment, the prediction filtering process uses a Kalman Filter, which is well suited to this task since mean and variance information (i.e. a Gaussian observation) of the available geolocation data of an observation can be used. More particularly, a discrete-time Kalman filter may be used. A suitable discrete-time Kalman filter for the prediction filtering process is described, for example, in the thesis document [1] Särkkä, S. (2006). RECURSIVE BAYESIAN INFERENCE ON STOCHASTIC DIFFERENTIAL EQUATIONS, Helsinki University of Technology Laboratory of Computational Engineering Publications (available online http://lib.tkk.fi/Diss/2006/isbn9512281279/isbn9512281279.pdf), in particular on page 54 and following. In the present description, if not stated otherwise, the notation used to described the use of a discrete-time Kalman Filter relates to the notation commonly used in this domain by the man skilled in the art, as detailed for example in the thesis document [1] in particular in the Notation section pages viii-xii. In the present description, the general background for the implementation of the discrete-time Kalman Filter filtering process can be found in the technical developments disclosed in the thesis document [1].

The process equations of the Kalman Filter are derived from a null-speed model assuming that the mobile device is motionless—i.e. has no speed. The process equations of the Kalman filter are used to determine a new predicted position $x_{k|k-1}$.

The State Space Model of the discrete-time Kalman filter can be described by the following mathematical expressions:

$$x_k A_{k-1} x_{k-1} + q_{k-1}$$

$$y_k = H_k x_k$$

where $x_k \in \mathbb{R}^n$ is the state of the Kalman Filter on time step k;

$y_k \in \mathbb{R}^m$ is the measurement at time step k, i.e. the observed position of the mobile device at time step k;

$q_{k-1} \sim N(0, Q_{k-1})$ is the process noise, equivalent to the normal distribution of the covariance of discrete-time process noise at jump from step k−1 to step k $r_k \sim N(0, R_k)$ is the measurement noise, equivalent to the normal distribution of the covariance matrix of measurement at step k;

the prior distribution is Gaussian $x_0 \sim N(m_0, P_0)$, equivalent to the normal distribution of $m_0$ mean of discrete-time Gaussian process on time step 0 and $P_0$ covariance of discrete-time Gaussian process on time step 0.

$A_{k-1}$ is the transition matrix of the dynamic model of jump from step k−1 and k;

$H_k$ is the measurement model matrix on time step k in linear Gaussian model.

According to the described technology, a null-speed model is implemented. Accordingly, the transition matrix $A_{k-1}$ is set to the identity matrix Id, and the measurement model matrix $H_k$ is set to the identity matrix Id. The process parameters of the discrete-time Kalman filter can be described by the following mathematical expressions:

$$Q_k = \text{diag}(\sigma^2 t)$$

$$R_k = \text{diag}(a^2)$$

where $Q_k$ is the covariance of the discrete-time process noise at jump from step k to k+1;

$\sigma^2$ the variance;

$R_k$ being the covariance matrix of measurement at step k;

a accuracy of the location estimate.

The prediction step of the discrete-time Kalman filter can be described by the following mathematical expressions:

$$m_k^- = A_{k-1} m_{k-1}$$

$$P_k^- = A_{k-1} P_{k-1} A_{k-1}^T + Q_{k-1}$$

where mk is the mean of discrete-time Gaussian process on time step k, i.e. the last filtered position of the mobile device;

$m_k^-$ is the predicted mean just before measurement $y_k$, i.e. the predicted position of the mobile device according to the last filtered position mk;

Pk is the covariance of the discrete-time Gaussian process on time step k;

$P_k^-$ is the predicted covariance just before measurement $y_k$.

The update step of the discrete-time Kalman filter can be described by the following mathematical expressions:

$$v_k = y_k - H_{k-1} m_k^-$$

$$S_k = H_k P_k^- H_k^T + R_k m_k^-$$

$$K_k = P_k^- H_k^T S_k^{-1}$$

$$m_k = m_k^- + K_k v_k$$

$$P_k = P_k^- - K_k S_k K_k^T$$

where $v_k$ is the innovation vector in optimal filter;

$S_k$ is the innovation covariance in optimal filter;

$K_k$ is the Kalman gain matrix in optimal filter.

If a new observed position $y_k$ is available on the geolocation module 20 at step time k, the process equations of the Kalman filter are solved to determine a new predicted position $m_k^-$ according to the last filtered position mk−1 and the new observed position $y_k$ of the mobile device.

If the new observed position $y_k$ is not provided by geolocation module 20, the process equations of the Kallman filter are solved to determine a new predicted position $m_k^-$ according to the last filtered position ink and an artificial position for the new observed position $y_k$ of the mobile device. The artificial position for the new observed position $y_k$ is determined according to the last new observed position $y_p$ received from the geolocation module 20, p being the time step where said last new observed position $y_k$ was received. In this situation, the artificial position for the new observed position $y_k$ corresponds to the position the user would be in, if he would not have moved since the last new observed position $y_p$ has been received from the geolocation module 20. It can be described with the following mathematical expression $$y_k = y_p$$

The prediction error is determined between the last predicted position $m_k^-$ and the last obtained position $y_p$ from the geolocation module 20, if no new location has been received. The covariance matrix Rk of measurement at time step k is determined according to the following mathematical expression:

$$Rk = \text{diag}(\alpha_k^2 k2)$$

The accuracy $\alpha_k^2$ at time step k is determined according to the following mathematical expression:

$$\alpha_k^2 = \frac{\alpha_p^2}{\sigma^2 \Delta_t} + \alpha_p$$

According to the described technology, by using a null speed model, and in particular the artificial position for the new observed position $y_k$, the filtered covariance Pk of the filtered position ink converges towards the last observed covariance $R_p$.

At the end of the prediction step S100, the Kalman Filter's state includes the predicted position $m_k^-$ of the corresponding stop period and the covariance Pk related to an associated level of uncertainty.

The sub-steps of the classification step S200 are illustrated in FIG. 3.

In a first sub-step S210, the covariance Pk associated to the filtered position $m_k$ is compared to a loss of signal threshold TSU. If the covariance Pk is superior to the loss of signal threshold TSU, then a message LS related to a loss of signal is generated, to indicate that information are insufficient to determine if the mobile device is in a stop period or not.

In a second sub-step S220, a normalized prediction error $nPrERR_k$ is determined, according to the predicted position $m_k^-$. The normalized prediction error $nPrERR_k$ is stored in a prediction error registry.

If a new observed location $y_k$ of the mobile device 10 can be determined according to the geolocation data stream provided by the geolocation module 20, a prediction error $PrERR_k$ is determined by computing the difference between the predicted position $m_k^-$ and said new location $y_k$ of the mobile device 10. During the second sub-step S220, the normalized prediction error $nPrERR_k$ is determined according to the prediction error $PrERR_k$ and an innovation covariance $S_k$, as expressed in the following mathematical expression:

$$nPrERR_k = \frac{PrERR_k}{S_k}$$

In a third sub-step S230, a smoothed prediction error sPrERR is determined, according to the normalized prediction error $nPrERR_k$ and previous normalized prediction errors stored in the prediction error registry. An exponential smoothing process—as described for example in the Wikipedia page https://en.wikipedia.org/wiki/Exponential_smoothing as retrieved on Mar. 7 2016—can be used to smooth, over a predefined smoothing time period STP, the prediction error PrERR, according to the previous prediction errors included in the prediction error registry. The predefined smoothing time period STP allows to define a level of certainty that needs to be reached to determine whether the mobile device is still in a stop period or not. The smaller the predefined smoothing time period STP the greater the sensibility of noise in the geolocation data. Consequently, the exponential smoothing process allows improving the assessment of predictions errors over time by verifying that the prediction errors are small enough over the predefined smoothing time period STP.

In a fourth sub-step S240, the smoothed prediction error sPrERR is compared to a prediction error threshold TPrE. The prediction error threshold TPrE relates to the geographical scale under which stop periods have to be identified. The prediction error threshold is unitless, since normalized values are used. For example, if it is suitable to detect stop in large points of interest like the third point of interest PoI3, the prediction error threshold TPrE should be greater than 0.25. By contrast, if it is suitable to detect stop in smaller points of interest like the first or second point of interest, the prediction error threshold TPrE should be typically smaller than 0.25.

If the smoothed prediction error sPrERR is smaller than the prediction error threshold TPrE, then, in a fifth sub-step S250, a STOP message related to a stop period of the mobile device 10 is generated, to indicate that a stop period of the mobile device is starting. The STOP message may also comprise the filtered position mk of the mobile device.

If the smoothed prediction error sPrERR is greater than the prediction error threshold TPrE, then, in a sixth sub-step S260, a MOVE message related to a move period of the mobile device 10 is generated, to indicate that a stop period of the mobile device is not on-going.

Based on STOP and MOVE messages received, during the action step S300, one or more actions are triggered and executed by the mobile device 10 and optionally by other devices coupled to the mobile device 10 and accessible through the communication network 12, such as a remote server or a local connected object.

The one or more actions may relate to actions in which determining a place where a user of the mobile device is currently located, according to current and past geolocation information, is useful. The patent document EP 15200364.6 [2] describes in particular means for determining a place where a user of the mobile device is currently located, and can advantageously used the STOP and MOVE messages to improve the services provided to the user of the mobile device. For example, when a STOP message has been received, the place where the user currently stands may be determined, using means described in the patent document [2], and, based on this knowledge, adapted features, such as initialize a transaction by credit card, or tips on the place, may be triggered.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method for determining a stop period of a mobile device in geographical locations, according to geolocation data related to the mobile device, and for triggering an action accordingly, the method being executed by the mobile device and comprising:
    (a) during a first step, determining a predicted position of the mobile device by executing a position prediction filtering process on the geolocation data, the predicted position of the mobile device being determined according to a filtered position obtained using a discrete-time Kalman Filter with the geolocation data and a first position related to the mobile device, wherein the first position is:
    either a current position of the mobile device if it is possible to obtain the current position from the geolocation data; or
    if the current position of the mobile device is not available from the geolocation data, an artificial position of the mobile device corresponding to a last received position of the mobile device available from the geolocation data;

(b) during a second step,
   determining a normalized prediction error according to a difference between the predicted position and the first position; and
   when the normalized prediction error is smaller than a prediction error threshold, generating a stop message to indicate that the stop period is starting, wherein the prediction error threshold is adapted to one of a plurality of different geographical scales at which stop periods are to be identified; and
   (c) during a third step, triggering an action on the mobile device, according to the stop message.

2. The method according to claim 1, wherein, during the second step, the normalized prediction error is stored in a prediction error registry and wherein a smoothed prediction error is determined by smoothing the normalized prediction error, over a predefined smoothing time period, according to prediction errors stored in the prediction error registry; the stop message to indicate that the stop period is starting being generated if the smoothed prediction error is smaller than the prediction error threshold.

3. The method according to claim 2, wherein the smoothed prediction error is determined by smoothing the normalized prediction error, over the predefined smoothing time period, according to the prediction errors stored in the prediction error registry using an exponential smoothing process.

4. The method claim 1, wherein during the second step, if the normalized prediction error is greater than the prediction error threshold, a move message is generated to indicate that the stop period is no longer on-going; and the action triggered during the third step is then interrupted or modified.

5. The method according to claim 1, wherein, the first step, the second step and the third step are executed every time a difference between the current position of the mobile device and one of previously known current positions of the mobile device over a predefined period, is greater than a minimum distance.

6. The method according to claim 1, wherein the first step, the second step and the third step are executed according to a predefined schedule, and/or upon detection of specific events.

7. The method according to claim 1, wherein, during the first step, an associated level of uncertainty is determined according to the filtered position, and wherein if the associated level of uncertainty is greater than a loss of signal threshold, a loss of signal message is generated to indicate that information are insufficient to determine if the mobile device is in a stop period; the action triggered during the third step being interrupted or modified.

8. A non-transitory computer program product comprising instructions for causing implementation of the method according to claim 1, when the instructions are run by the processor.

9. A mobile device comprising:
   a processor configured to:
      determine a stop period of the mobile device in geographical locations, according to geolocation data related to the mobile device, and trigger an action accordingly,
      determine a predicted position of the mobile device by executing a position prediction filtering process on the geolocation data, the predicted position of the mobile device being determined according to a filtered position obtained using a discrete-time Kalman Filter with the geolocation data and a first position related to the mobile device, wherein the first position is:
      either a current position of the mobile device if it is possible to obtain the current position from the geolocation data, or
      if the current position of the mobile device is not available from the geolocation data, an artificial position of the mobile device corresponding to a last received position of the mobile device available from the geolocation data;
      determine a normalized prediction error according to a difference between the predicted position and the first position;
      when the normalized prediction error is smaller than a prediction error threshold, generate a stop message to indicate that the stop period is starting, wherein the prediction error threshold is adapted to one of a plurality of different geographical scales at which stop periods are to be identified; and
      trigger an action on the mobile device, according to the stop message.

10. The method according to claim 1, wherein the plurality of different geographical scales comprise one or more combinations of a first geographical scale at a city level, a second geographical scale at a building level, and a third geographical scale at a room level.

11. The mobile device according to claim 9, wherein the plurality of different geographical scales comprise one or more combinations of a first geographical scale at a city level, a second geographical scale at a building level, and a third geographical scale at a room level.

\* \* \* \* \*